US008695807B2

(12) United States Patent
Knittel

(10) Patent No.: US 8,695,807 B2
(45) Date of Patent: Apr. 15, 2014

(54) MUCKING DEVICE

(76) Inventor: Lyle Dean Knittel, Brentwood, CA (US)

( * ) Notice: Subject to any disclaimer, the term of this patent is extended or adjusted under 35 U.S.C. 154(b) by 26 days.

(21) Appl. No.: 13/310,590

(22) Filed: Dec. 2, 2011

(65) Prior Publication Data
US 2013/0140220 A1   Jun. 6, 2013

(51) Int. Cl.
*A01B 1/00*   (2006.01)
(52) U.S. Cl.
USPC .................. 209/419; 294/177; 294/179
(58) Field of Classification Search
USPC ........ 209/417–419; 294/52, 177, 179, 49, 55; D30/162; 15/257.6; 56/400.11–400.13; 43/7, 11
See application file for complete search history.

(56) References Cited

U.S. PATENT DOCUMENTS

| | | | | | |
|---|---|---|---|---|---|
| 1,234,195 | A | * | 7/1917 | Murphy | 209/419 |
| 1,289,916 | A | * | 12/1918 | Robetaille | 209/419 |
| 1,510,757 | A | * | 10/1924 | Ball | 209/419 |
| 1,619,266 | A | * | 3/1927 | Miller | 209/419 |
| 2,480,924 | A | * | 9/1949 | Heger | 43/4 |
| 4,305,376 | A | * | 12/1981 | Neugent | 126/242 |
| 5,033,781 | A | * | 7/1991 | Flood | 294/1.4 |
| 5,820,179 | A | * | 10/1998 | Tsou | 294/1.4 |
| 6,732,402 | B1 | * | 5/2004 | Hsu | 15/257.6 |
| 7,111,741 | B2 | * | 9/2006 | Bramante | 209/614 |
| 7,540,544 | B2 | * | 6/2009 | Berto | 294/55.5 |
| D662,268 | S | * | 6/2012 | Pearcey | D30/162 |
| 8,516,737 | B2 | * | 8/2013 | Hume | 43/11 |

* cited by examiner

*Primary Examiner* — Jeremy R Severson
(74) *Attorney, Agent, or Firm* — Fountainhead Law Group P.C.

(57) ABSTRACT

Apparatus and methods for mucking livestock enclosures and separating bedding material from animal waste are disclosed. Various embodiments are directed toward a mucking device having a scoop portion with a basket connected to a handle and a sliding lid that can be opened and closed by sliding a rotating sleeve along an inner shaft of the handle. The scoop of the mucking device can be inverted by rotating the inner shaft relative to the rotating sleeve, thus causing the basket to be disposed above the lid. Bedding material can be sifted out of the basket while retaining the animal waste. Once a desired amount of bedding material has been separated, the scoop can be opened by sliding the rotating sleeve along the inner shaft to open the lid and thus release the retained animal waste and residual bedding material. Other embodiments are directed toward methods for using the mucking device.

14 Claims, 6 Drawing Sheets

MUCKING DEVICE

BACKGROUND

The present invention relates to livestock care and stable maintenance tools and devices, and in particular, to a mucking devices and methods for using same.

Boarding, stabling, and transporting horses and other livestock animals requires the removal of animal waste from pens, stalls, paddocks, trailers and other areas where the animals are housed, kept or transported. The removal of animal waste is required not only for the health and safety of the animals being housed, but can also provide the users with the opportunity to reclaim value from the animal waste in the form of manure. The manure can be used as a resource on the user's own property, as fertilizer or mulch, but can also provide a secondary form of income from the sale of the manure. The process and task of removing animal waste, such as horse maneuver, is traditionally referred to as mucking.

Conventional mucking typically involves removing all soiled bedding material from animal stall or pen. In such practices, users simply use a shovel or other scooping implement to remove all the bedding along with the animal waste. For economic reason, some users choose to sift through the bedding material to remove only the animal waste and the soiled bedding material, while leaving behind the majority of the clean and unsoiled bedding material. Such practices are intended to reduce the amount of bedding used and, consequently, reduce the expense of the bedding material in the animal boarding operation.

Traditionally, sifting through the bedding material to remove only the animal waste and the soiled bedding material requires the use of a pitchfork or a specially made mucking or manure rake. The sifting process using conventional tools, such as a pitchfork or a mucking rake, is a time and labor intensive process which may or may not be justified by the cost savings achieved by salvaging the bedding material from a soiled animal enclosure. For the sake of simplicity and clarity, examples of mucking an animal enclosure, while attempting to salvage unsoiled bedding material, will be described in reference to horse boarding and care.

When mucking a horse's stall, a user will first locate the area to be cleaned. Such areas, which are often lined with a bedding material like saw dust, wood shavings or straw, are usually soiled by some combination of urine and animal feces. Once the area to be cleaned is located, the user will scoop up some amount of material that typically includes a combination of urine, manure, bedding material, dirt and mud. The user will then shake, bounce or sift the material to allow the unsoiled bedding material to pass through or over the walls of the scoping implement. The scoping implement, like a pitch fork or mucking rake, include a number of elements that are spaced out such that the manure and urine clumped bedding material will be held, while the unsoiled and loose bedding material and dirt will pass through the spaces between the elements. Examples of such elements include the tines of a pitchfork or a grating or grid of mucking rake. Once the majority of the unsoiled and loose bedding material and dirt passes through the scooping implement, the animal waste and some amount of the soiled bedding material can be deposited in a receptacle for storage, transport, or disposal. This process is repeated until all of this animal waste and soiled bedding material is removed from the horse stall.

Despite the apparent simplicity of the task, mucking a horse stall is an arduous and messy endeavor. The weight of a shovelful of material, material that includes some amount of bedding material and animal waste, can be quite heavy to lift. Additionally, bouncing, shaking, and sifting the un-soiled bedding material from the animal waste and the soiled bedding material can require a significant amount of effort due to the weight of the material and the arrangement of the different constituent parts of the material lifted. It is not uncommon that the animal waste desired to be removed to become tangle or trapped in the bedding material, thus making it more difficult to separate the waste and soiled bedding material from the bedding material that can still be used.

In addition to the physical effort and strain to bounce, shake or sift, the material, the difficulty and unpleasantness of the task is compounded by the fact that excessive agitation of the material to separate the waste from the bedding material often causes significant amounts of dust, animal waste particulate matter, and bedding material to be dispersed into the air of the area being cleaned. Such material dispersed into the air can potentially cause health and hygiene hazards for caretakers and animals alike. Embodiments of the present disclosure are directed toward simplifying, and reducing the amount of effort, unpleasantness, and potential hazards associated with mucking an animal stall or enclosure.

SUMMARY

Embodiments of the present invention are directed a mucking device for cleaning stall of livestock animals, such as horses. The mucking device includes an inner shaft as the in core of a handle the inner shaft can include solid or hollow cylindrical shaft having an outer diameter. The mucking device further includes a rotating sleeve which fits about the inner shaft and has an inner diameter larger than the outer diameter of the inner shaft. At one end of the inner shaft, a basket is rigidly coupled along having with a movable lid coupled to the rotating sleeve via a rotational coupler and engaged with the basket via rails and slides.

Other embodiments of the present invention are directed toward methods of using a mucking device. Such embodiments include sliding a rotating sleeve disposed around an inner shaft, that is coupled to a lid of a basket, in a first direction along the inner shaft, to configure the lid in an open position relative to the basket. Once mucking device is in the open position, material, such as combinations of bedding material and horse manure, is scooped into a volume of the basket. With the basket loaded with material, the rotating sleeve can be slid, in a second direction along the inner shaft, to configure the lid in a closed position relative to the basket. The scoop in such a closed position defines an enclosed volume of the scoop.

With the lid in the closed position, a user can allow some of the material, such as unsoiled bedding material, to fall through a plurality of grates in the basket. The user can then rotate the rotating sleeve relative to the inner shaft to configure the basket in an inverted position in which the basket is disposed above the lid and allow some more of the material to fall through a plurality of grates in the lid in the inverted position. The rotating sleeve can then be slid along the inner shaft in the first direction again to pull the lid into an open position, thus allowing the material, such and the horse manure, to be released into an area of the users choosing, such a bucket, wheelbarrow or other receiving vessel or area.

DETAILED DESCRIPTION

Described herein are apparatuses, devices, and methods for use in the care and maintenance of livestock. Specifically, a mucking device for the removal of horse waste from bedding material used to line stables, stalls, pens, trailers, and other enclosures, and methods for using same, are disclosed. As used herein, the term mucking refers to the process or task of and tool for cleaning animal waste from bedding material, such as sawdust, wood shavings, or straw, from the areas in which horses and other livestock are kept. One of ordinary skill in the art will recognize that embodiments described herein can be used in the caretaking of animals other than horses. For example, devices, apparatuses, and methods described herein can be used in the care and maintenance of livestock animals such as cows, goats, sheep, and any other type of animal which are housed, kept, or transported with some type of bedding material that becomes soiled with animal waste.

In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
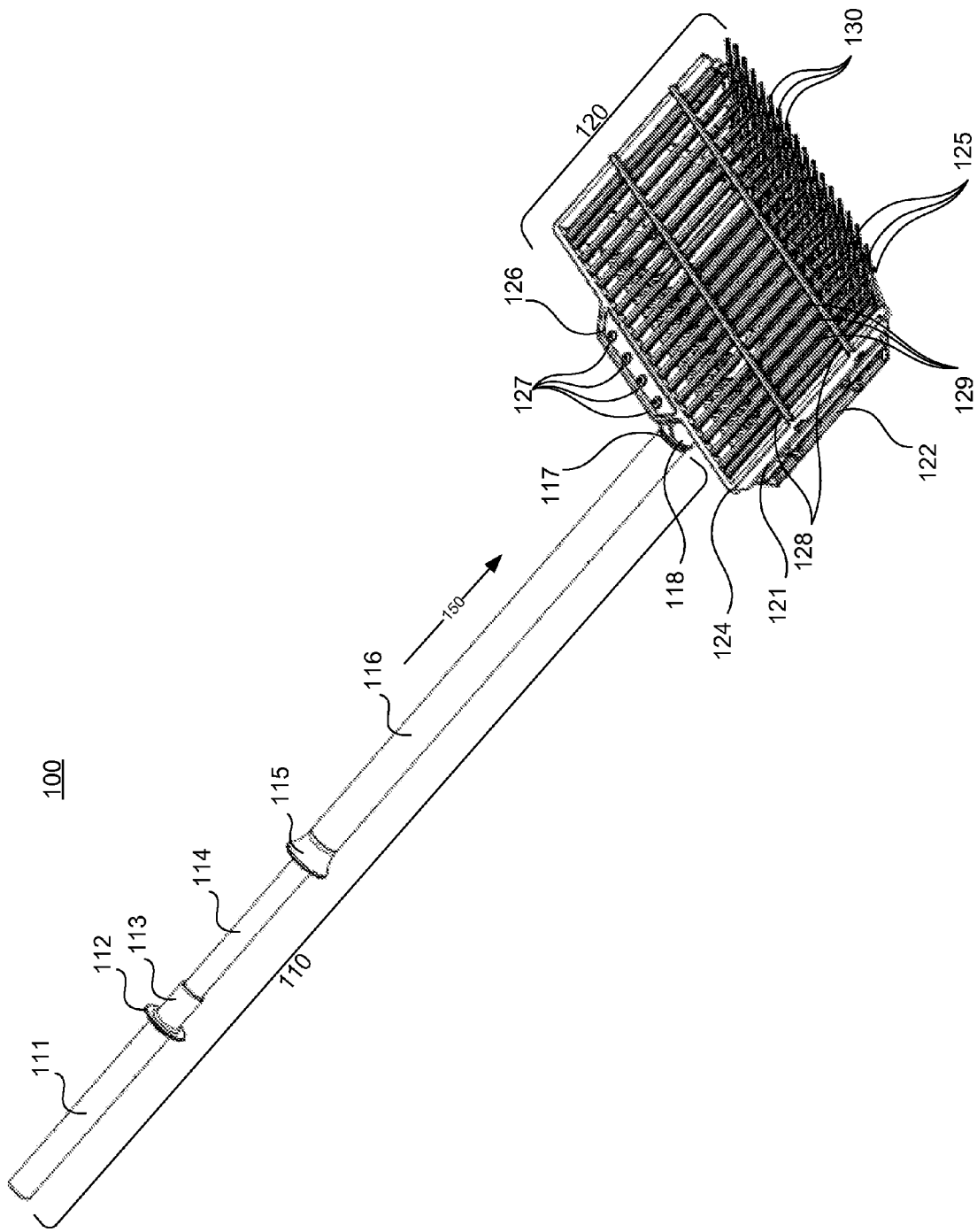
FIG. 1 illustrates a mucking device, according to various embodiments of the present invention, in a closed position.

FIG. 1 shows a view of a mucking device 100 according to various embodiments of the present invention. As shown in FIG. 1, the mucking device 100 includes a number of elements. These elements can be, for the purpose of description, separated into two sections. Specifically, the mucking device can include a handle section 110 and a scoop section 120. The handle section 110 includes elements and features for manual manipulation by a user, while the scoop section 120 includes elements and features for the manipulation of material, such as bedding material and animal waste.

Handle section 110 can include a back grip 111, coupled to or adhered to one end or section of an inner shaft 114. The handle section 110 additionally includes a rotating sleeve 116 that jackets the inner shaft. The end of the inner shaft 114 distal to the end to which back grip 111 is coupled, can be coupled to one or more elements of scoop section 120. The proximal end of the inner shaft 114 can be coupled to the back grip 111. The rotating sleeve 116 and the inner shaft 114 can be dimensioned such that the rotating sleeve 116 can rotate around the longitudinal axis of the inner shaft 114 as well as slide along the longitudinal axis of the inner shaft 114. In such embodiments, the rotating sleeve 116 can be dimensioned and disposed such that the rotating sleeve 116 can rotate around and move along inner shaft 114 such that rotating sleeve 116 can positioned anywhere along inner shaft 114, including, but not limited abutting back grip 111. In the view shown in FIG. 1, rotating sleeve 116 is positioned at a position along inner shaft 114 in a direction 150 away from the back grip 111 end of the inner shaft 112.

In some embodiments, the inner shaft and the rotating sleeve 116 can be coaxial tubular members. The inner shaft 114 can have an inner diameter and an outer diameter. The rotating sleeve 116 can also have an inner diameter and an outer diameter. In other embodiments, the inner shaft 114 can be a solid cylinder, in which the inner shaft only has an outer diameter. In either embodiment, the outer diameter of inner shaft 114 can be dimensioned such that it is less than the inner diameter of rotating sleeve 116. The difference between the outer diameter of the inner shaft 114 and the inner diameter of rotating sleeve 116 can be sized appropriately to allow the rotating sleeve 116 to move relative to inner shaft 114. The outer diameter of rotating sleeve 116 can be dimensioned for the hand size of the intended user. Accordingly, the dimensions of the inner shaft 114, back grip 111, and rotating sleeve 116 can be dimensioned to fit the typical hand size of a man, woman, or child.

In some embodiments, the outer dimensions of the back grip 111, the inner shaft 114, and the rotating sleeve 116 can have outer diameters or other dimensions ranging from 1 to 4 inches. However the outer dimensions, including, but not limited to, outer diameter and length, of the back grip 111, the inner shaft 114 and the rotating sleeve 116 can vary depending on the size, weight, and other physical specifications or structural requirements of mucking device 100.

Handle section 110 can also include a number of safety and ergonomic features such as grip collar 112, spacer 113, and rotating sleeve collar 115. Grip collar 112 can be disposed on the end of the back grip 111 closest to the rotating sleeve 116, while rotating sleeve collar 115 can be disposed on the end of the rotation sleeve 116 closest to the back grip 111. In embodiments having one or more of such collars, the grip collar 112 and the rotating sleeve collar 115 can help prevent a user's hand from being pinched between the grip handle 111 and the rotating sleeve 116 as the inner shaft 114 and the grip handle are moved relative to the rotation sleeve 116.

Other embodiment can include a spacer element 113 to prevent the back grip 111 or grip collar 112 from being a pinch point with the rotating sleeve 116 or rotating collar sleeve 115, where a user's hand might be pinched as the rotating sleeve 116 and the inner shaft 114 and the back grip 111 are moved relative to one another, thus further increasing the safety of the mucking device 100. Spacer element can include a tubular body including an inner and surface and outer surface and have an inner diameter and an out diameter. The inner diameter of spacer element 113 can be dimensioned such that it fits around inner shaft 114 and the outer diameter of spacer element 113 can be dimensioned so that it is large than the inner diameter of rotating sleeve 116 such that rotating sleeve will not fit over spacer element 113. In related embodiments, spacer element 113 can be made of a shock absorbing material, such as rubber, to absorb the shock of the rotating sleeve 116 being stopped abruptly when it is moved toward the back grip end of the inner shaft 114, thus providing an ergonomic advantage to the user of mucking device 100.

Rotating sleeve 116 can be rotatably coupled via rotational coupler 117 to one or more elements of scoop section 120, and inner shaft 114 can be rigidly coupled to one or more elements of scoop section 120, such that the inner shaft and the scoop portion 120 can be rotated relative to rotating sleeve 116. For example, rotating sleeve 116 can be coupled to bracket 118 via rotational coupler 117 and inner shaft 114 can be disposed through an opening in rotational coupler 117 such that the inner shaft 114 can move relative to an inner surface of the rotating sleeve 116 and an inner surface of the rotational coupler 117. In some embodiments, rotational coupler 117 can include a ring bearing having an inner surface and an outer surface around an inner volume. In such embodiments, inner shaft 114 can be dispose inside the inner volume of the ring bearing of the rotational coupler 117.

As shown in FIG. 1, bracket 118 can be coupled to lid 124 of scoop section 120 via fasteners 127 at mounting plate 126. Fasteners 127 can include screws, rivets, weld joints, epoxy connections, snap joints, and the like. In some embodiments, fasteners 127 can be removable to facilitate the replacement or adjustment of lid 124. In other embodiments, fasteners 127 can be permanent or integrally formed with lid 124 or bracket 118. In other embodiments, bracket 118 and lid 124 are integrally formed as a single element.

In similar embodiments, scoop section 120 can include a lid 122 and a basket 122. Lid 124 engages basket 122 via slides 121 which engage and/or capture rails 123 of basket 122. Rails 121 and slides 123 are disposed on either side of scoop section 120 such that the lid 124 can open and close over an inner volume of basket 122 by sliding in a direction, such as direction 150, parallel to the longitudinal axis of inner shaft 114 and or rotating sleeve 116. Slides 123 can include one or more elements having a U shaped or C shaped profile defining an inner region. The inner region can be dimensioned to accommodate rail 123 of basket 122 such that lid 124 moves only in a direction parallel to rails 123. In such embodiments, lid 124, when in the closed position shown in FIG. 1, cannot be removed from basket 122 by moving in a direction perpendicular to rails 123 or in any other direction not parallel to rails 123. Accordingly, lid 124 slides along rails 123 in a direction parallel to the longitudinal direction of rails 123.

Lid 124 can include a number of elements including, but not limited to, a plurality of slats 129 coupled to one or more cross members 128. As shown in FIG. 1, lid 124 and rotating sleeve 116 are shown disposed in a "closed" position configuration 100 in which the lid 124 and basket 122 in define an inner enclosed volume. Embodiments like the one shown in FIG. 100, when rotating sleeve 116 slides along the outer surface of inner shaft 114 along the longitudinal axis of inner shaft 114, lid 124 moves relative to basket 122 to open and close scoop section 120. In such embodiments, the lid 124 moves relative to basket section 122 in the direction parallel to the longitudinal axis of inner shaft 114 and rotating sleeve 116.

FIG. 1 also shows that lid 124 can include one or more cross members 128 coupled to at one of the tines or slats of lid 124 for support or structural stability. Cross members 128 can be disposed in a non-parallel orientation to the slats of the lid 124. For example, as shown, the cross members 128 can be disposed perpendicularly, while in other embodiments, the cross members 128 can be disposed in a crisscross or diagonal pattern.

Figure 2:
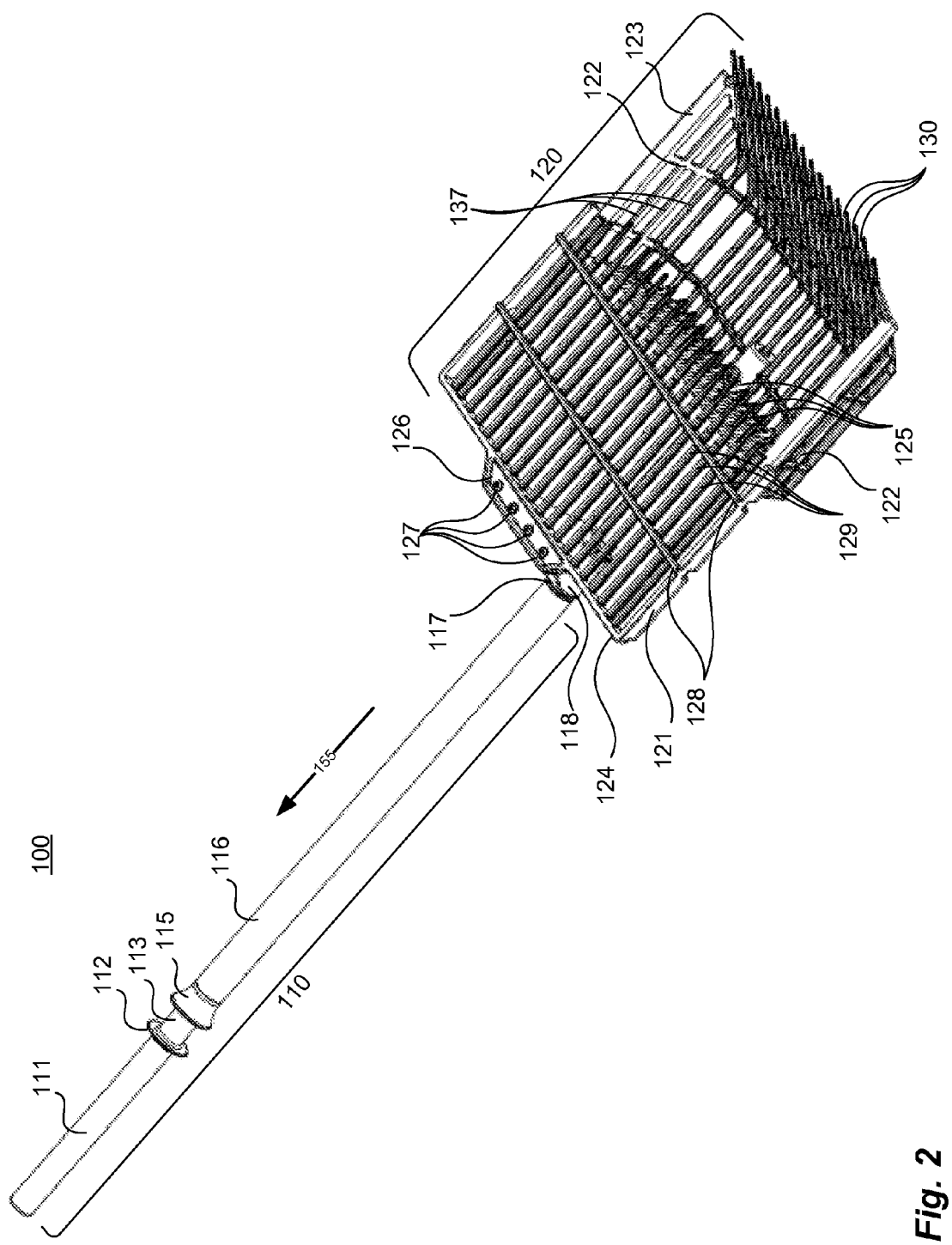
FIG. 2 illustrates a mucking device, according to various embodiments of the present invention, in an open position.

FIG. 2 shows a view of mucking device 100 in an open position, according to various embodiments of the present invention. As shown, rotating sleeve 116 and lid 124 are disposed in positions such that scoop section 120 is in an "open" position configuration when rotating sleeve 116 is moved in direction 155 along the inner shaft 114 toward the back grip 111 end of the inner shaft 114. Lid 124, being coupled to rotating sleeve 116 via fasteners 127, bracket 118, and rotating coupler 117, slides relative to the basket 122 when the rotating sleeve 116 is moved relative to the inner shaft 114.

It is in the open position that scoop section 120 can be used to scoop up or load material into the inner volume of basket 122. The inner volume of basket 122 can be defined by a number of sides that include a plurality of slats 137 and cross members which form walls of grates or grids. The spacing of the slats and cross members can be customized based on the intended use of the mocking device. The spacing of the slats 137 and cross members can be determined based on the expected size of the animal waste and the particular size and granularity of bedding material to be separated. For example, the slats 137 and the slats 128 of the basket 122 and lid 124 can be spaces approximately 2-3 cm apart for use to remove horse manure from wood-shavings type bedding material.

Lid 124 an basket 122 can include tapered or pointed tines 125 and 130 that can interlace when the mucking device is in a "closed" position, such as when the lid 124 disposed with slides 121 are fully engaged with rails 123. For example, lid 124 can include slats 129 including front tines 131 which interlace with tines 130 coupled to slats on the front of basket 122 when the mucking devices in the closed position. By interlacing times 125 of the lid 122 with tines 130 of the basket 122, material which has dimensions greater than the spacing between slats 129 in the lid 122 and the slats 137 in basket 122, will be retained within the enclosed inner volume of scoop section 120. In related embodiments, tines 130 of basket 122 can be used as a pitchfork or rake when the mucking device is in an open position.

Figure 3:
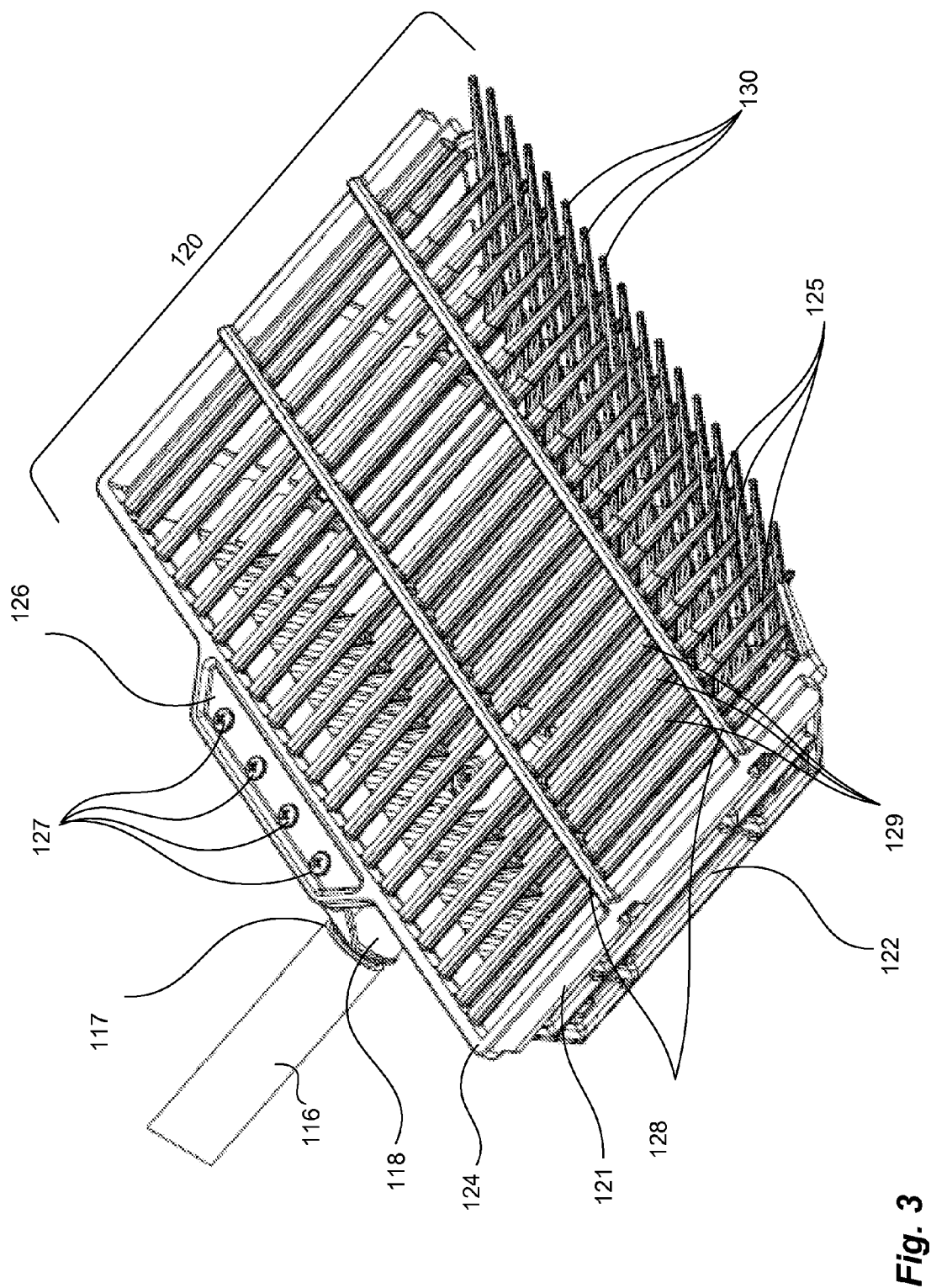
FIG. 3 illustrates a section view of a scoop section of a mucking device in the closed position, according to various embodiments of the present invention.

FIG. 3 shows a closer view of scoop section 120 of mucking device 100 in a closed position, according to various embodiments of the present invention. Slides 121 are shown fully engaged with rails 123 such that lid 124 can move relative to basket 122 in a direction parallel to the slides 121 and rails 123 when rotating sleeve 116 is moved relative to inner shaft 114. Lid 124 is thus cannot be removed or dislodged in a direction substantially perpendicular to the orientation of the slide 121 and rails 123. It is in this closed and locked position that the scoop section 120 can be inverted to quickly and efficiently separate the animal waste and soiled bedding material from the unsoiled bedding material.

Figure 4:
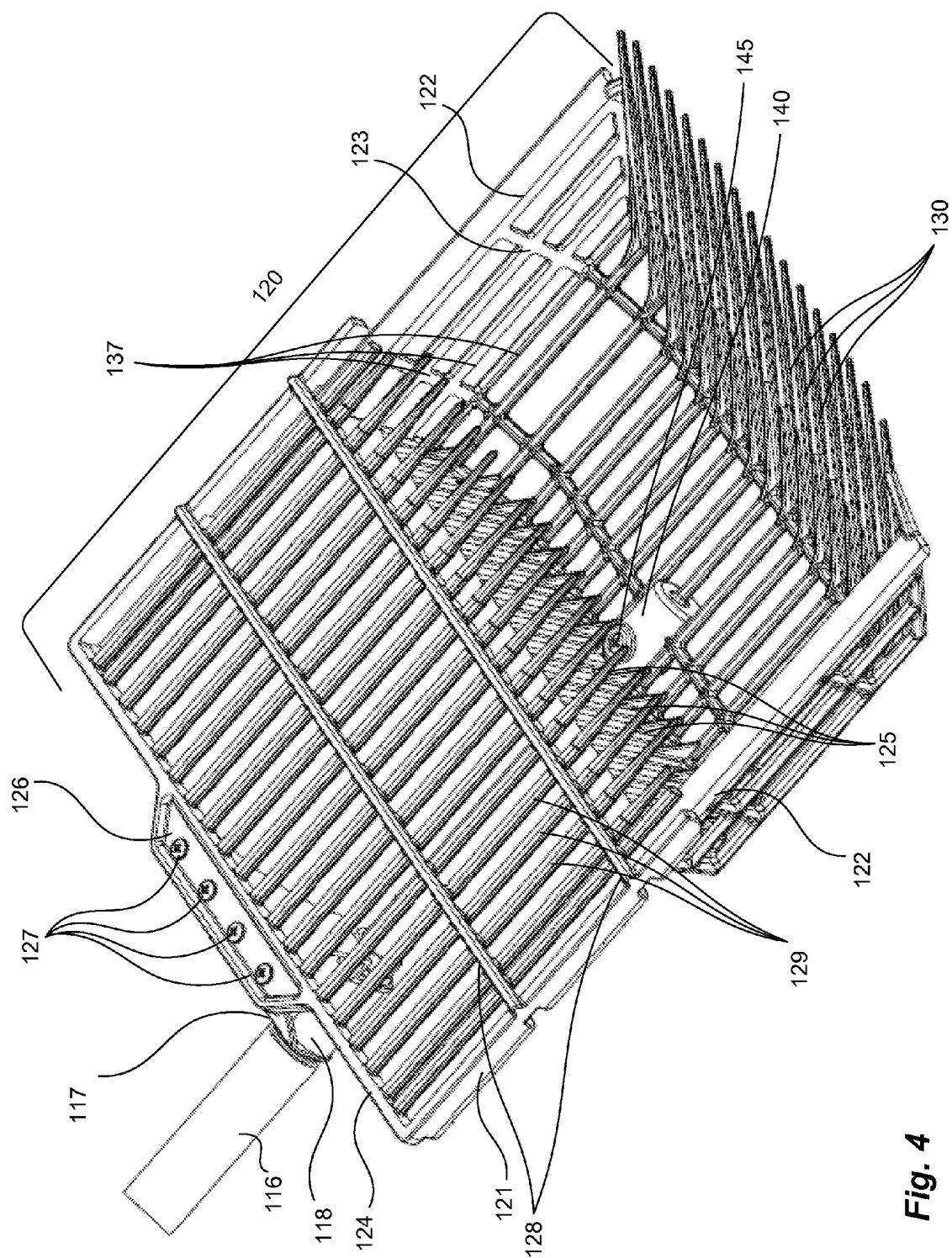
FIG. 4 illustrates a section view of a scoop section of a mucking device in the open position, according to various embodiments of the present invention.

FIG. 4 shows a view of the scoop section 120 of mucking device 100 in an open position, according to various embodiments of the present invention. As shown, lid 122 is coupled to bracket 118 via fasteners 127 at mounting plate 126. Lid 122 can be slid open relative to basket 122 by pulling back on rotating sleeve 116 coupled to bracket 118 via rotating coupler 117. In some embodiments, the friction between slides 121 and rails 123 can be reduced by including lubrication or a low friction material, such as Teflon™, between the mating surfaces. As can be seen in FIG. 4, inner shaft 114 is coupled to basket 122 at mounting sleeve 140 via fastener 145. In some embodiments, mounting sleeve 140 can be coupled to basket 122, while in other embodiments, mounting sleeve 140 can be integrally formed with basket 122, such as in injection molding or cast metal forming. In either embodiment, the mounting sleeve 140 can be disposed inside, partially inside, or outside the internal volume of basket 122. The placement of mounting sleeve 140 at As with, fasteners 127, fasteners 145 can include screws, rivets, pins, cotter pins, epoxy, glue, resin, etc. In some such embodiments, the fastener 145 is removable, while in other embodiments fastener 145 is permanent. As shown, in FIG. 4, mounting sleeve 140 can include an inner cylindrical volume to receive one end of the inner shaft 114. In such embodiments, the inner shaft can include a cylindrical end that can be inserted into the mounting sleeve 140. In other embodiments, the inner surface of the inner volume of mounting sleeve 140 and the outer surface of the section of the inner shaft When rotating sleeve 116 is moved toward the back grip 111 end of the handle section 110 of the mucking device 100, the inner shaft 114 pushes basket 122 relative lid 124 to position the scoop section 120 in an open position. In such embodiments, the rotating sleeve 116, back grip 111, spacer element 113, lid 124, basket 122, slides 121 and rails 123 can be dimensioned such that slides 121 and rails 123 are at least partially engaged when mucking device is in the open position. For example, rotating sleeve 116 can only move along inner shaft 114 to the point that the distal side of lid 124 overlaps with the proximal end of the basket 122. Such restrictions on the movement of the lid 124 relative to basket 124 can help maintain the slides 121 and rails 123 aligned with one another.

Figure 5:
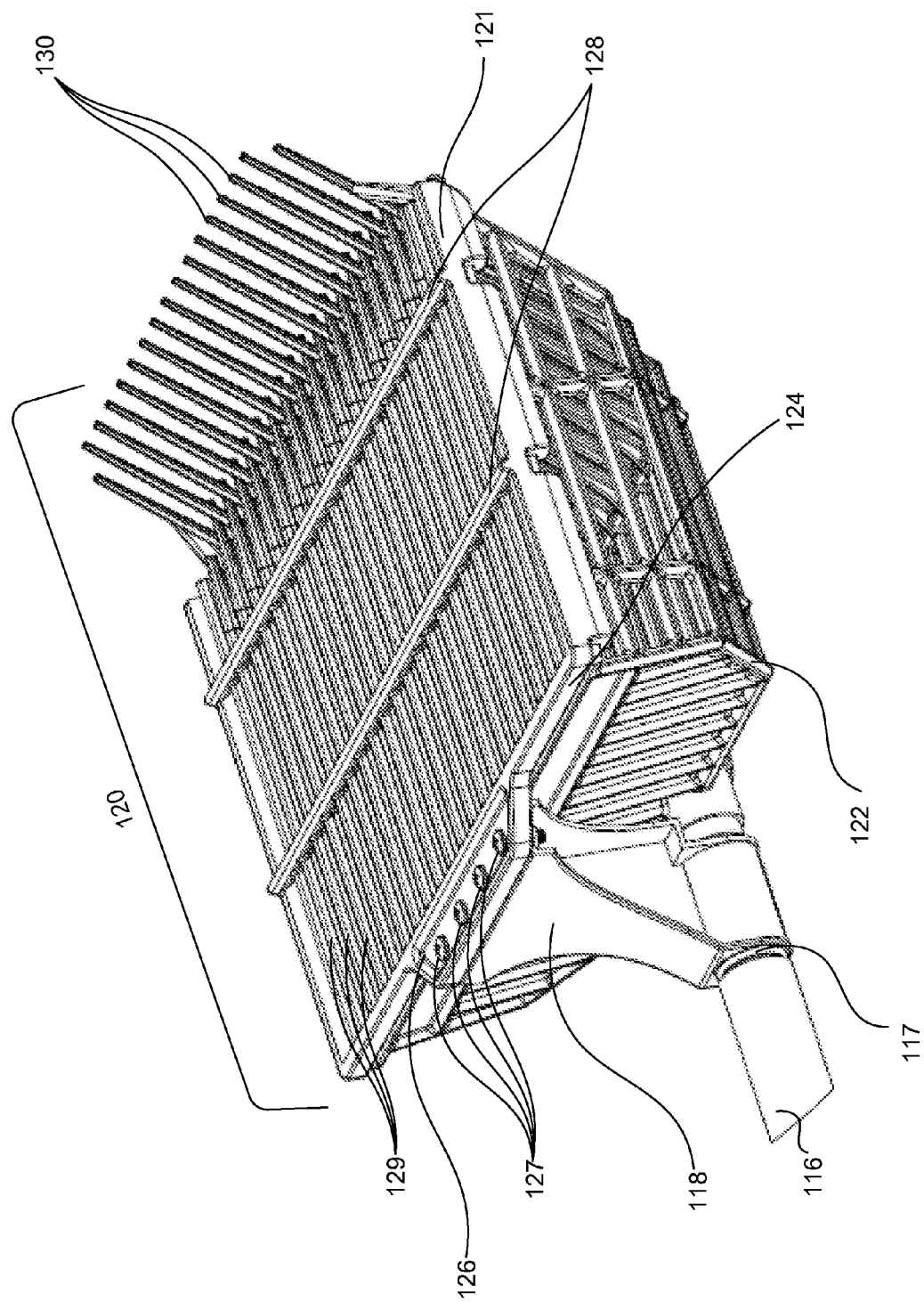
FIG. 5 illustrates another section view of a scoop section of a mucking device in the closed position, according to various embodiments of the present invention.

FIG. 5 shows yet another view of scoop section 120 of mucking device 100, according to various embodiments of the present invention. As shown in FIG. 5, tines 130 can extend beyond the plane of lid 124 and at an angle to slats 129 and tines 125. The extension of tines 130 allows the mucking device 100 to be used a fork-like took in the open or closed position, further increasing the utility of the mucking device 100.

Each of the elements of the mucking device discussed above can include or be constructed out of various materials, including, but not limited to, metals, such as aluminum, plastics, polymers, resins, fiber glass, wood, rubber, or any combination thereof. For example, handle section 110 can include an aluminum inner tubular inner shaft 114, an aluminum rotating sleeve 116, plastic collars 112 and 115, a rubber spacer element 113, and combination rubber and plastic back grip 111. Scoop section 120 can include a combination of a plastic or polymer lid 124 and basket 122 with various metal fasteners 127 and 145, such as screws. Furthermore, each of the components described herein can be modified to meet certain weight and strength requirements for the intended duty of use or of the intended user. For example, any of the elements discussed herein can be made to include hollow or solid sections or various components can be made with cut-outs or triangular bracing to further reduce weight. Such embodiments are advantageous for mucking devices 100 that are intended to be used by home users or hobbyist and are expected to used for light duty purposes only. Alternatively, any of the elements or features of mucking device 100 can be thicker, stronger, or heavier to be better suited for heavy-duty usage that might be expected in an industrial or commercial environment.

Figure 6:
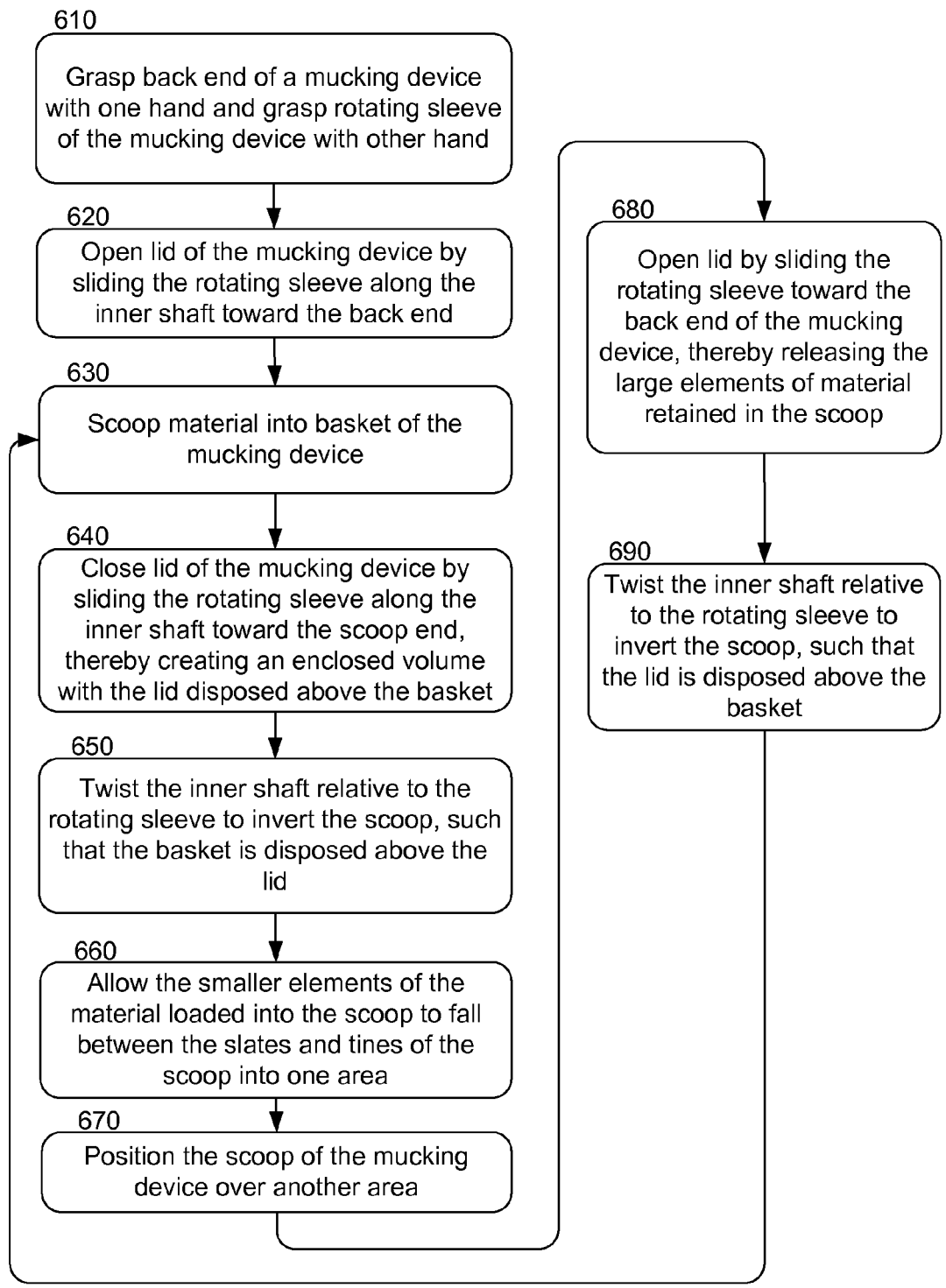
FIG. 6 is a flowchart of a method for using a mucking device according to embodiments of the present invention.

FIG. 6 is a flowchart of a method for using mucking device 100 according to various embodiments of the present invention. Such methods allow for a user to clean or remove animal waste and soiled bedding material from an animal pen or enclosure, such as a horse stall or trailer. The method begins with a user grasping the back or back grip 111 end of mucking device 100 with one hand and the rotating sleeve 116 with the other at 610. The mucking device 100 can be in the closed position to begin. At 620, the user can open the lid 124 of the scoop section of the mucking device by manipulating the rotating sleeve 116 to slide it along the inner shaft 114 toward the back grip 111 end of the handle section 110. The rotating sleeve 116 can be moved along the shaft until it abuts the spacer element 115 or back grip 111, or is disposed at any other point along the inner shaft 114.

At 630, the user can load material, including animal waste and bedding material, into the now open volume of the basket 122 using a scooping or shoveling motion. Once material is loaded into the basket 122, the user can close the lid 124 of the scoop section 120 by sliding the rotating sleeve along the inner shaft 114 toward the scoop section 120 of mucking device 100, in action 640. This motion closes the scoop section 120 and creates an enclosed volume with the lid 124 disposed above the basket 122. In this position, the user can be shake or agitate the scoop section 120 by manipulating handle section 110 to sift any bedding material located below any animal waste scooped into the enclosed volume defined by the lid 124 and basket 122. Having the lid 124 disposed above basket 122 help to prevent spilling any animal waste over the top edge of the basket 122, as is common with other contemporary manure forks or rakes. This advantageously allows the user to avoid scooping the same animal waste multiple times, thus making the mucking process more efficient than is possible with other devices.

At action 650, with the lid 124 in the closed position, the user can turn or twist the inner shaft 114, which is rigidly coupled to the scoop section 120 to invert the scoop section 120 so that basket 122 is disposed above lid 124. In some embodiments, wherein the mounting sleeve 140 is disposed totally or partially externally to the inner volume of basket 122, the scoop section 120 will automatically invert because of gravity when the user releases his or her grip on grip end 111 of mucking device 100. At action 660, the user can allow material that is smaller than the spacing between the slat of scoop section 120 to fall, by sifting, shaking or otherwise agitating the scoop section of 120 by manipulating handle section 110.

When a sufficient amount of bedding material and other matter has been separated from the larger elements of the material retained in the enclosed volume disposed between the lid 124 and the basket 122, the user can position the scoop section 120 of the mucking device over a receiving area or vessel, in action 670. Once the scoop section of the mucking device 100 is positioned over the desired area, the user can open the lid 124 by sliding the rotating sleeve 116 along the inner shaft 114 toward the back grip 111 end of the mucking device, thereby releasing the any material retained in the inner volume disposed between lid 124 and basket 122, in action 680. When all of the material has been release or allowed to fall out of the scoop section 120, the user can twist, torque or turn the inner shaft relative to the rotating sleeve to invert the scoop section 120, such that the lid 124 is disposed above the basket 122 in an open position, in action 690. Actions 630 through 690 can be repeated as desired to clean a particular area.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A mucking device comprising:
   an inner shaft having an outer diameter and a first end and a second end;
   a rotating sleeve, having an inner diameter larger than the outer diameter of the inner shaft disposed around the inner shaft;
   a basket rigidly coupled to the first end of the inner shaft; and
   a movable lid coupled to the rotating sleeve via a rotational coupler and engaged with the basket via rails and slides;
   wherein the inner shaft, the basket, and movable lid move rotationally relative to the rotating sleeve about the longitudinal axis of the inner shaft.

2. The mucking device of claim 1 wherein the movable lid comprises a first plurality of slats that form a first grate.

3. The mucking device of claim 2 wherein the basket comprises a second plurality of slats that form a plurality of walls.

4. The mucking device of claim 3 wherein the second plurality of slats comprise a first plurality of tines that extend at an angle to and beyond a plane in which the first grate is located.

5. The mucking device of claim 4 wherein the first plurality of slats comprises a second plurality of tines disposed in a plane parallel to the first grate.

6. The mucking device of claim 1 further comprising a spacer element disposed around the inner shaft between the first end and the second end.

7. The mucking device of claim 6 wherein the spacer element comprises a rubber material.

8. The mucking device of claim 1 further comprising a back grip have a third inner diameter and disposed around the second end of the inner shaft and wherein the third inner diameter is dimensioned to fit around the outer diameter of the inner shaft.

9. A mucking device of claim 1 wherein the basket is rigidly coupled to the first end of the inner shaft at a mounting sleeve disposed on an exterior surface of the basket.

10. A method of using a mucking device comprising:
sliding a rotating sleeve disposed around an inner shaft, that is coupled to a lid of a basket, in a first direction along the inner shaft, to configure the lid in an open position relative to the basket;
scooping material into a volume of the basket;
sliding the rotating sleeve, in a second direction along the inner shaft, to configure the lid in a closed position relative to the basket;
allowing some of the material to fall through a plurality of grates in the basket;
rotating the rotating sleeve about the longitudinal axis of the inner shaft to configure the basket in an inverted position in which the basket is disposed above the lid; and
allowing some of the material to fall through a plurality of grates in the lid in the inverted position.

11. The method of claim 10 further comprising sliding the rotating sleeve along the inner shaft in the first direction opposite the second direction to configure the lid in the open position while the basket is disposed above the lid.

12. The method of claim 10 wherein allowing material to fall through a plurality of grates in the basket and the lid comprises agitating the basket and the lid by manipulating the inner shaft and rotating sleeve.

13. The method of claim 10 wherein the material includes an amount of animal waste and an amount of bedding material.

14. The method of claim 10 wherein rotating the rotating sleeve relative to the inner shaft comprises twisting a back grip coupled to the inner shaft in one direction while maintaining an original orientation of the rotation sleeve.

* * * * *